Inventor
Joachim Kolbe

Jan. 1, 1952     J. KOLBE     2,580,558
CASTER AND CAMBER COMPENSATION FOR BANKING VEHICLES
Filed Nov. 22, 1947     9 Sheets-Sheet 2

Inventor
Joachim Kolbe
By
Attorney

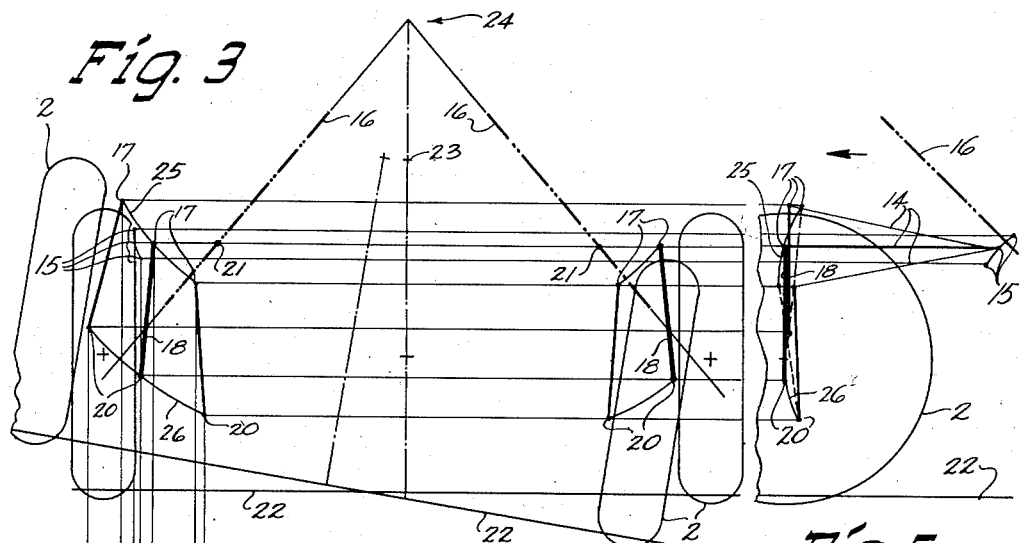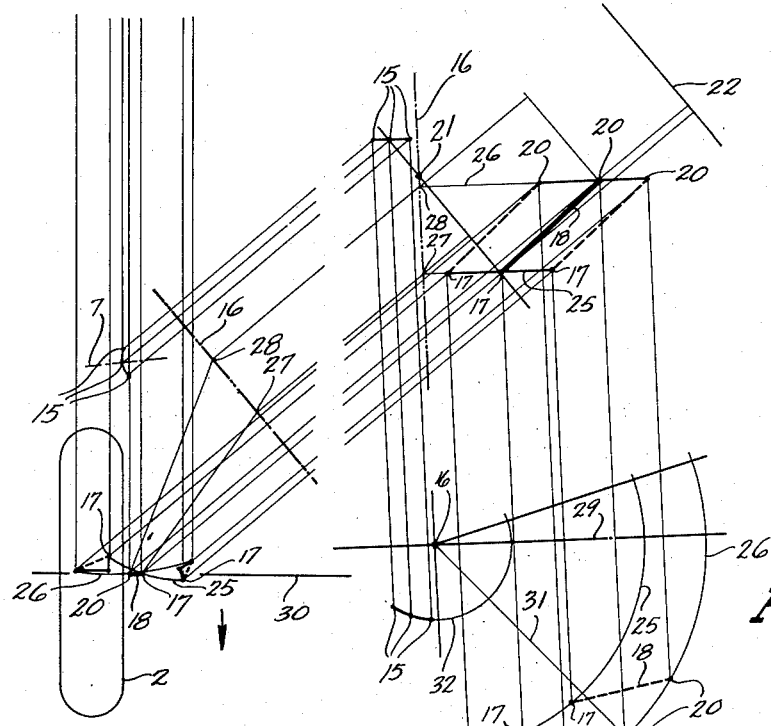

Jan. 1, 1952 J. KOLBE 2,580,558
CASTER AND CAMBER COMPENSATION FOR BANKING VEHICLES
Filed Nov. 22, 1947 9 Sheets-Sheet 4
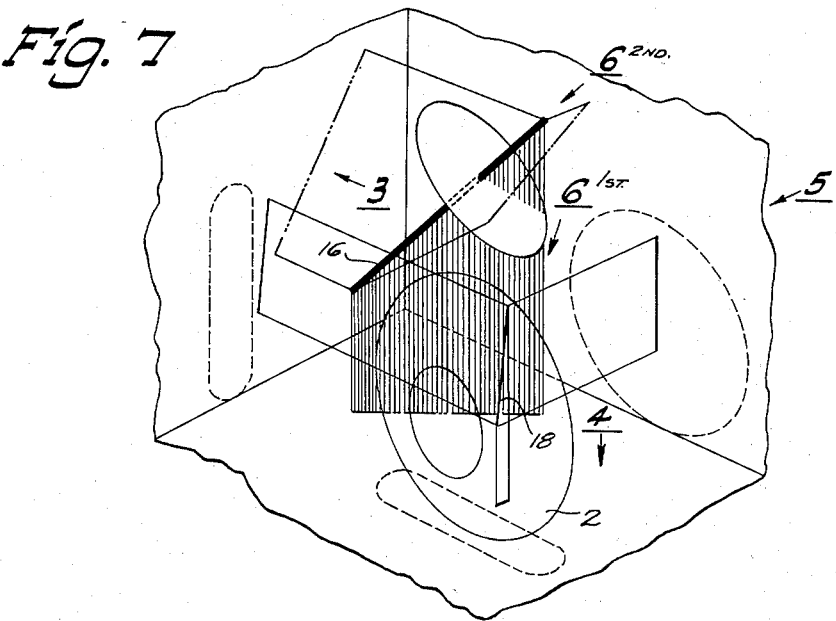
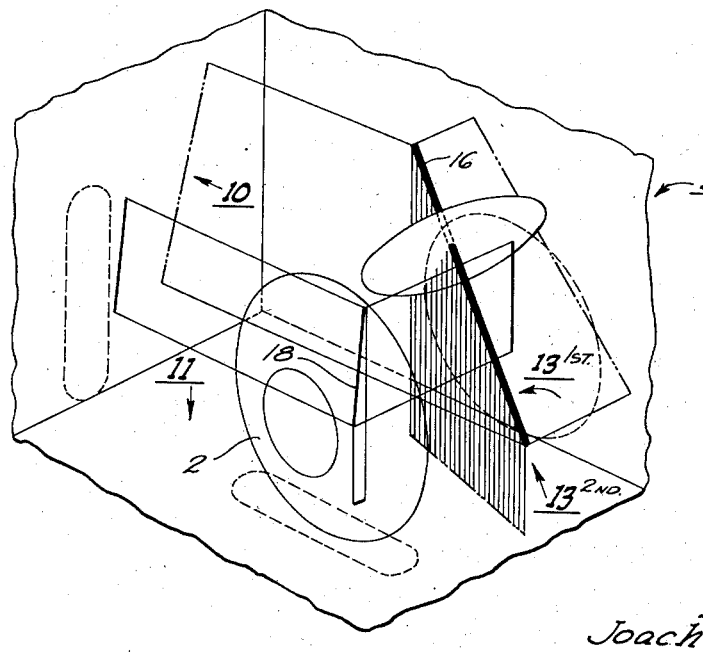
Inventor
Joachim Kolbe
By Elwin A. Andrus
Attorney

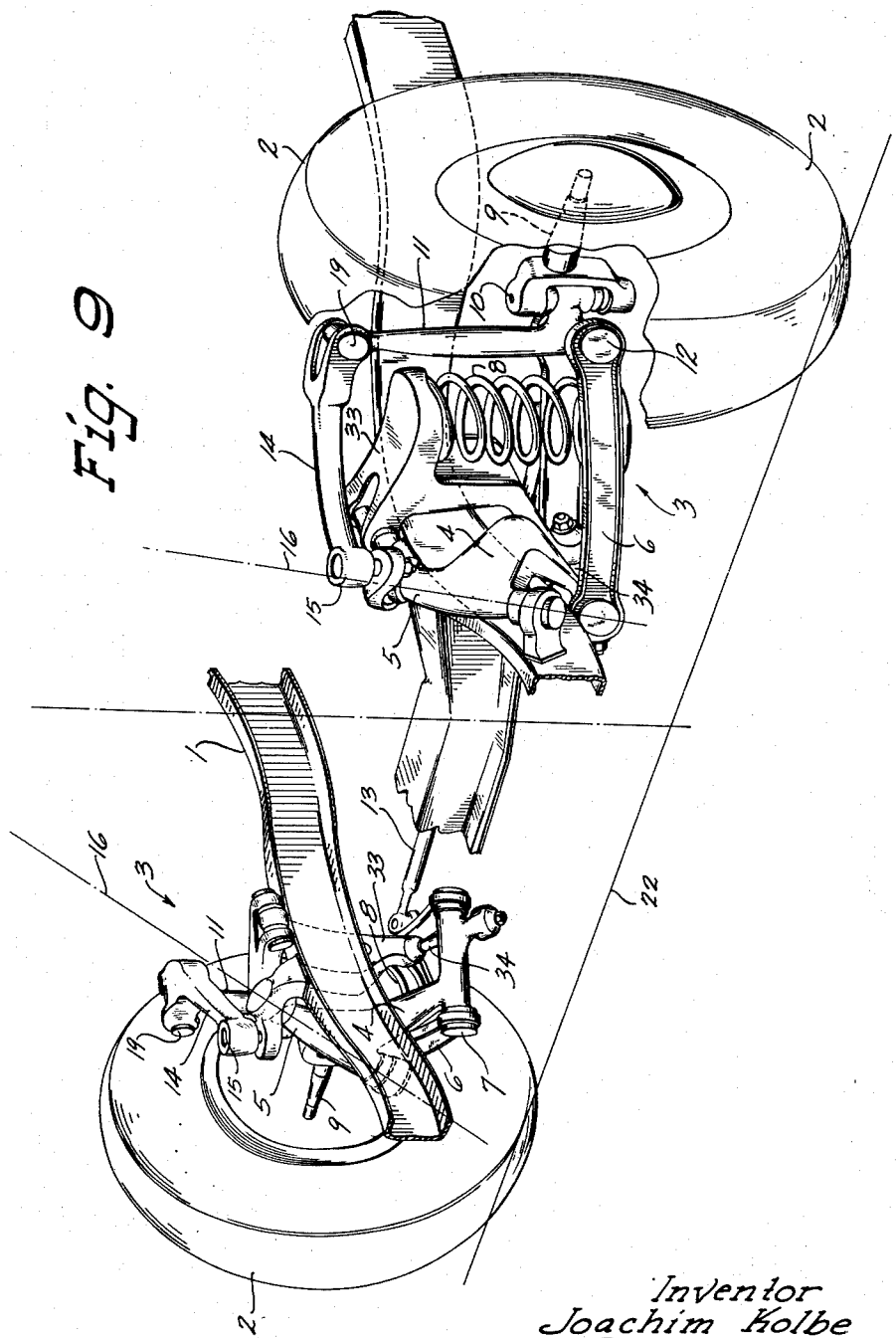

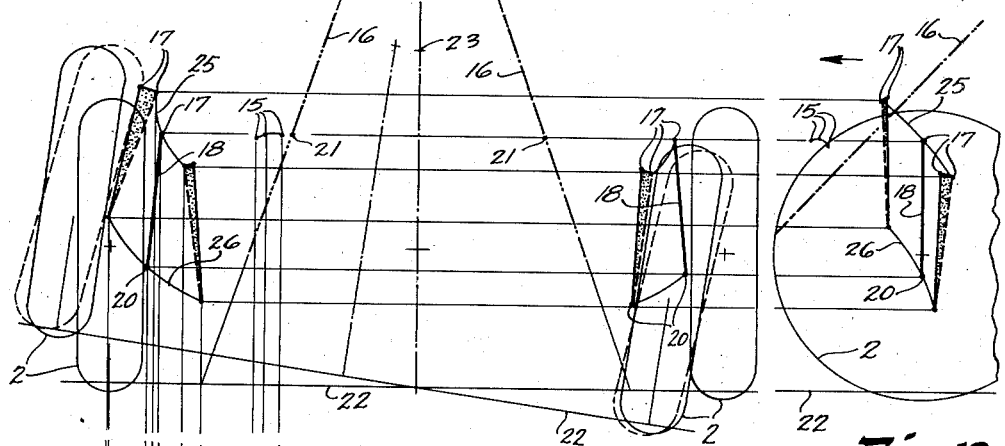

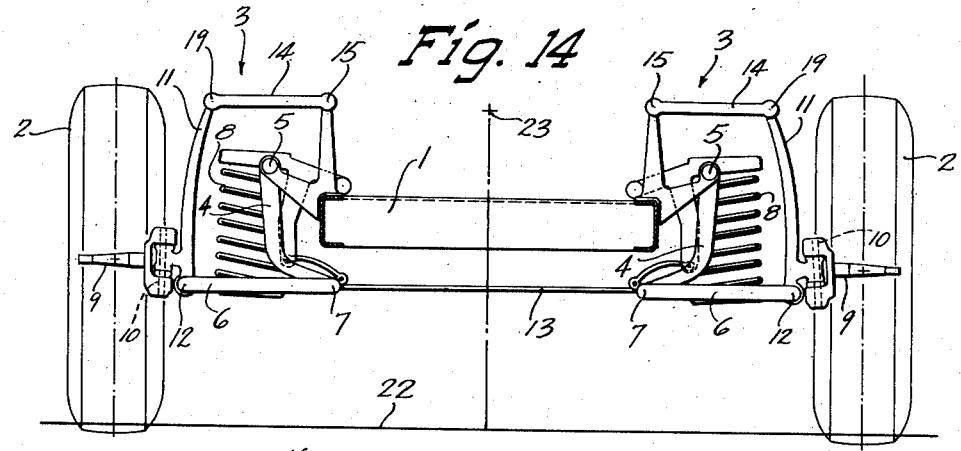
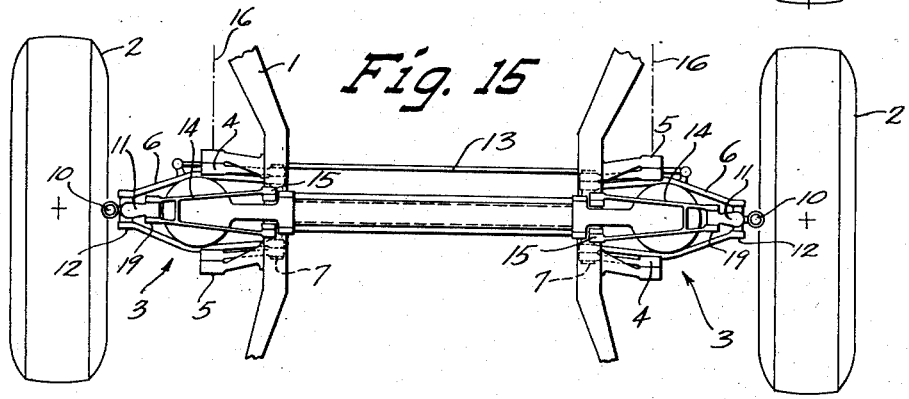
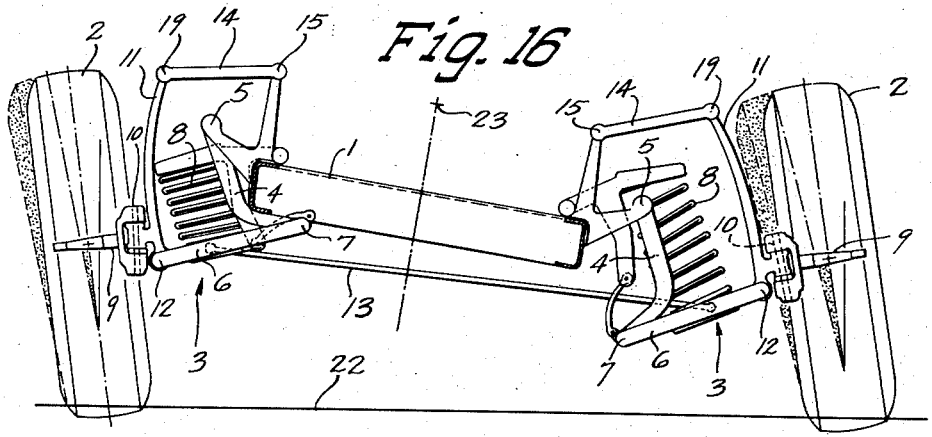
INVENTOR.
Joachim Kolbe

Jan. 1, 1952   J. KOLBE   2,580,558
CASTER AND CAMBER COMPENSATION FOR BANKING VEHICLES
Filed Nov. 22, 1947   9 Sheets-Sheet 8

Inventor
Joachim Kolbe
By
Attorney

Jan. 1, 1952 J. KOLBE 2,580,558
CASTER AND CAMBER COMPENSATION FOR BANKING VEHICLES
Filed Nov. 22, 1947 9 Sheets-Sheet 9

Inventor
Joachim Kolbe
By
Attorney

Patented Jan. 1, 1952

2,580,558

UNITED STATES PATENT OFFICE 2,580,558

CASTER AND CAMBER COMPENSATION FOR BANKING VEHICLES

Joachim Kolbe, Milwaukee, Wis.

Application November 22, 1947, Serial No. 787,499
In Great Britain December 10, 1946

30 Claims. (Cl. 280—124)

This invention relates to vehicles having a superstructure supported upon wheels in such a manner that the wheels are allowed normal oscillation for absorbing road shocks and the superstructure is allowed considerable lateral movement relative to the wheels. Such wheel mountings connecting the wheels and the superstructure are particularly designed to effect a tilting of the superstructure towards the inside of a curve as the vehicle travels around the curve and to return the superstructure to a normal upright position as the vehicle travels in a straight path so that additional riding comfort to the vehicle passengers is afforded. The wheel mountings utilize the centrifugal force acting upon the superstructure as the vehicle travels around the curve to effect the tilting movement. The oscillation springs or other means return the superstructure to the normal position and maintain the same upright under normal conditions.

The invention is particularly intended to be employed where individual wheel mountings connect the wheels and the superstructure to maintain the wheels in their proper relationship with the road at all times regardless of the relative positions of the superstructure, and where the wheels are carried by corresponding wheel knuckles which are disposed to pivot about a kingpin or other substantially vertical axis.

The invention is particularly applicable to vehicles in which the superstructure is pivotally connected to the wheel carriers to provide rotation of the respective carriers and their wheels relative to the superstructure about corresponding banking axes, and which rotational movement would, but for the present invention, effect an undesirable movement of the corresponding wheel relative to the road.

A principal object of the invention is to provide means whereby the wheels of a vehicle are maintained in an improved relationship to the road at all times during the travel of the vehicle.

Another object is to provide a vehicle employing inclined banking axes and having means whereby the wheel spindles and kingpin supports are properly maintained relative to the point of road contact of the wheels at all times during the turn of the same about the corresponding banking axes.

Another object is to provide for an improved camber and caster of the kingpin supports for the steerable wheels to maintain optimum standards of safety and control of the vehicle at all times during the travel of the vehicle and at the same time provide for greater banking effects with inclined banking axes.

Another object is to provide means whereby the camber and caster of the kingpin supports for the steerable wheels on either side of the vehicle may be controlled independently of each other.

Another object is to provide means whereby the wheels of the vehicle may be maintained in a predetermined relation to the road regardless of the lateral forces acting upon the vehicle.

Another object is to provide means controlling the caster and camber of the kingpin supports of the steerable wheels responsive to changes in lateral forces acting upon the vehicle to more effectively compensate for and overcome any unfavorable influence of the lateral forces upon the steering operation of the vehicle.

Another object is to provide means whereby unfavorable changes in caster and camber of the steerable wheels inherent in certain types of wheel mountings or otherwise unavoidable because of practical limitations may be compensated for or offset to provide acceptable net caster and camber changes.

Another object is to provide means whereby in a banking car an effective banking axis may be created outside of or between the hinge elements of the wheel mountings to allow greater flexibility of design.

Another object is to provide means whereby the effective banking axis may be controlled and shifted in response to certain conditions of road travel.

Another object is to provide means whereby either or both the tread width and wheel base may be more desirably controlled during banking of the superstructure on turns.

Another object is to provide means whereby banking cars having horizontal, longitudinally disposed banking hinges may be provided with a control of the independently suspended wheels and adjustment of camber therefor.

Another object is to provide means whereby the elements of the banking mountings may be operated through predetermined angular movements in a certain timed sequence in response to given conditions of road travel.

Other objects and advantages of the invention will be set forth hereinafter.

The invention is illustrated in the accompanying drawings in which:

Figs. 3, 4, 5 and 6 are geometrical layouts in front elevation, plan view, side elevation and true length turnover views, respectively, of the front wheels and the hinge axes therefor similar to that shown in Figs. 1 and 2 and illustrating the application of the invention thereto;

Fig. 7 is a perspective composite geometric layout illustrating the views of Figs. 3 to 6, inclusive;

Fig. 8 is a similar perspective layout for the embodiment of Figs. 9 to 13;

Fig. 9 is a perspective view of a pair of front wheels and their wheel carriers of different design showing the application of the invention thereto;

Figs. 10, 11, 12 and 13 are geometrical layouts in front elevation, plan view, side elevation and true length turnover views, respectively, of the front wheels and the hinge axes therefor shown in Fig. 9;

Fig. 14 is a front elevation of the front end of a vehicle employing horizontal banking axes shown with the superstructure in upright non-banked position;

Fig. 15 is a plan view of the structure of Fig. 14;

Fig. 16 is a view similar to Fig. 14 showing the superstructure in inward banked position;

Figure 1:
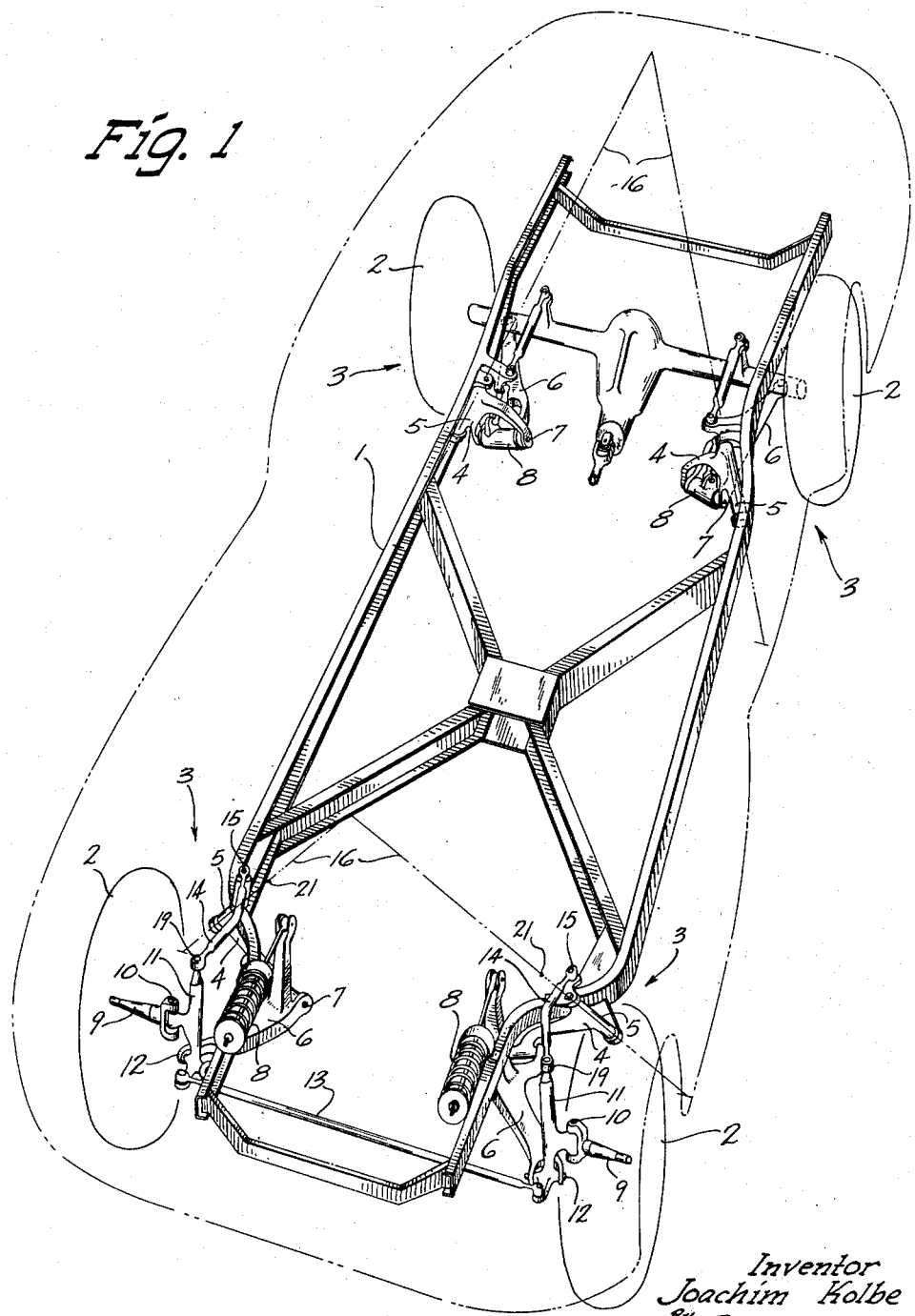
Figure 1 is a perspective view of a vehicle mounting of the type to which the invention is particularly adapted showing the superstructure of the vehicle in an upright, unbanked position.

The drawings illustrate the invention as applied to mountings similar to those set forth in the copending applications by the present inventor, Serial No. 724,062, filed January 24, 1947, now Patent No. 2,576,686, granted November 27, 1951, Serial No. 742,496, filed April 19, 1947, and Serial No. 771,717, filed September 2, 1947, for Letters Patent on inwardly banking vehicles.

The present application constitutes a continuation in part of the present inventor's copending application, Serial No. 641,707, filed January 17, 1946, now abandoned.

The vehicles illustrated comprise the superstructure 1 which may be made up of the chassis frame, engine, body and load of a passenger automobile or other vehicle, and the supporting wheels 2 which support the superstructure on the road or track.

The wheels are arranged in one or more sets, each set constituting one or more pairs, with the wheels of each pair disposed in axial alignment on opposite sides of the superstructure. In a passenger automobile such as that illustrated, there are two sets of wheels, one at the front end of the superstructure and the other at the rear end of the superstructure, and each set comprises a single pair of wheels.

The wheels 2 are secured to the superstructure 1 by the wheel carriers 3 which provide for vertical oscillation of each wheel relative to the superstructure for the purpose of giving a soft ride to the latter on rough roads.

The wheel carriers 3 are arranged in pairs similar to the wheels, and one or more pairs may be employed for connecting each set of wheels 2 to the superstructure. In the various constructions to be described single pairs of the various wheel carriers 3 illustrated are to be employed for each single pair of wheels of the vehicle.

Each wheel carrier is pivoted to a banking hinge support member 4 which in turn is pivoted to the superstructure by a banking hinge 5. The suspension arm 6 of the wheel carrier is pivoted to the member 4 by a substantially horizontal hinge 7 and to the corresponding wheel support member.

A spring 8 is provided for each carrier 3 and may be disposed as set forth in copending application Serial No. 742,496, referred to above, to control vertical oscillation of the wheel by turn of the suspension arm 6 about the hinge 7 and to control banking of the superstructure by turn at the banking hinge 5.

Each wheel carrier constitutes either the whole or a part of a counterbanking arm as set forth in copending application Serial No. 724,062, referred to above, depending upon whether a rigid axle structure or an independent wheel suspension is employed.

The present invention has to do solely with banking arms constituting independent wheel mountings and which include both the wheels and the corresponding wheel carriers as parts of the banking arms.

The invention further has to do with all such banking arms in which the wheel support member embodies a spindle or bearing structure 9 guided by a kingpin 10 or corresponding substantially vertical pivotal connection which in turn is secured in place by a kingpin support member 11 pivoted to the outer end of the suspension arm 6 by a horizontal hinge 12 parallel to hinge 7.

The banking arms are arranged in pairs with the arms of each pair connected by a suitable tie rod 13 to compel the arms to operate in unison as set forth in copending application Serial No. 724,062, referred to above.

Figure 17:
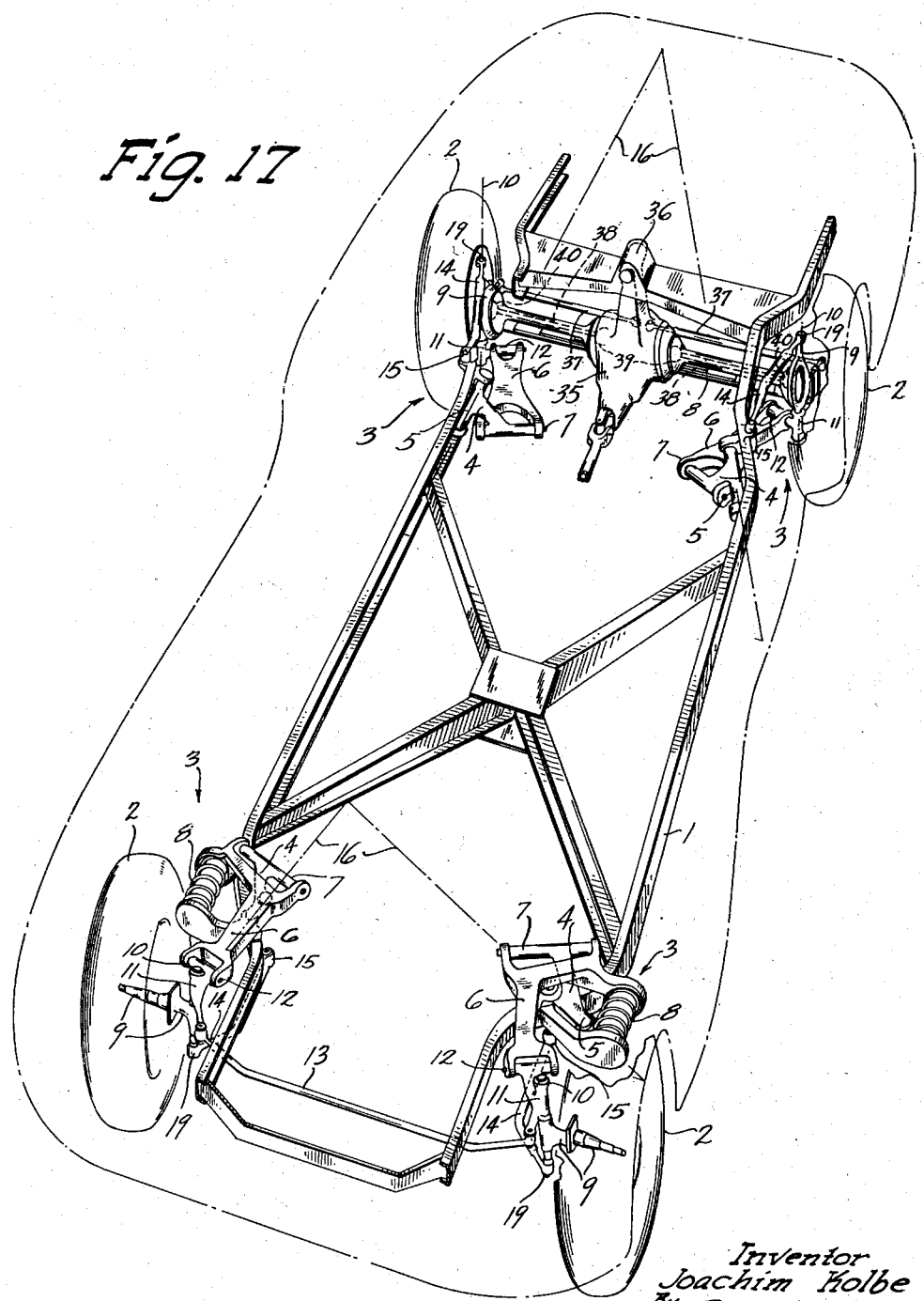
Fig. 17 is a perspective view similar to Fig. 1 showing another embodiment of the invention and its application to an independent wheel suspension for the rear drive wheels.

The wheels may be either steered as in the case of front wheels, or they may be blocked against steering as in the case of independently suspended rear drive wheels as set forth in applicant's copending application Serial No. 771,717, referred to above, and as shown herein in Fig. 17.

Prior to the present invention it has been brought by the present inventor to be necessary to construct the suspension arm 6 either as a single member rigid with the kingpin support member 11, or as a double member arranged to provide a parallelogram suspension in which the outer end of each member is pivoted to the kingpin support member 11. The former construction effected a very considerable change in camber and caster both as a result of vertical oscillation of the wheel relative to the superstructure and of banking of the superstructure. The latter construction substantially overcame the change in camber and caster resulting from vertical oscillation of the wheel, but did not prevent the change due to banking of the superstructure.

The present invention utilizes the parallelogram suspension feature to control or eliminate any change in caster and camber due to vertical wheel oscillation, and at the same time utilizes one of the suspension arms for each carrier as a control arm to control or eliminate any change in caster and camber due to banking movement at hinge 5. This is accomplished by connecting the control arm 14, referred to, directly between the kingpin support member 11 and the superstructure 1, and offsetting its connection with the superstructure in a predetermined manner from the axis of banking hinge 5.

Referring to the embodiment illustrated in Figs. 1 to 7, inclusive, the front steerable wheels 2 are independently mounted and constitute the outer end of each of the corresponding banking arms. The wheel carriers 3 are disposed substantially longitudinally of the superstructure 1, and each comprises the banking hinge support member 4, lower suspension arm 6, spring 8 and upper control arm 14.

The rear wheels of this embodiment are carried by a rigid axle structure and therefore are not concerned in the present invention. The rear wheel carriers 3 are, however, in the form of banking arms to provide for banking of the rear end of the superstructure corresponding to the banking of the front end. It is also noted that springs 8 for the rear carriers are in the form of rubber torsion springs encircling the oscillating hinge 7 and having its outer shell connected to the superstructure for operating the spring upon turn at the banking hinge 5.

Referring now to the independent front wheel carriers, the lower suspension arm 6 and control arm 14 are disposed normally in substantially parallel planes and provide a parallelogram suspension for the corresponding kingpin support member 11.

By reason of this parallelogram suspension, vertical oscillation of the corresponding wheel 2 is effected with substantially no change in either caster or camber of the wheel.

By reason of the parallelogram suspension, the position of the banking hinge 5 and of the longitudinal disposition of the arms 6 and 14, there is substantially no change in camber during banking movements on turns and the wheels remain substantially upright at all times.

The outer end of the control arm 14 is pivoted to the kingpin support 11 at a point substantially spaced vertically from the pivot 12 between suspension arm 6 and support 11.

For the purpose of controlling the change in caster during banking on turns, the change can be substantially reduced by disposing the pivotal connection 15 between the control arm 14 and the superstructure 1 in a certain relation to the axis 16 of banking hinge 5.

In all embodiments of the invention the pivot 15, which may be called the control point, must be offset from the axis 16 in order to effect any control. The control is dependent upon the amount of this offset and the direction of the offset relative to the direction of the wheel carrier 3 from the axis 16.

In general, the control point 15 should be about the same height as the point 17 on the kingpin axis 18 that lies in the horizontal plane of the center of the pivotal connection 19 between control arm 14 and kingpin support 11. The point 17 may be said to be the controlled point on the kingpin axis 18. A non-controlled point 20 on the kingpin axis 18 is determined by the intersection of the axis 18 with the horizontal plane of the center of the pivot 12 between the suspension arm 6 and the kingpin support 11.

The control point 15 should be offset on that side of axis 16 corresponding to the offset of the controlled point 17 from a plane containing axis 16 and the non-controlled point 20.

The amount of offset of control point 15 from the plane referred to generally determines the amount of control or correction of the wheel position, which in the embodiment of Figs. 1 to 7 is represented almost solely by control of caster.

Given the above requirements, whether the control point 15 is on the far side or the near side of the point 21 on the banking hinge axis 16 lying in the same horizontal plane as point 17, determines the increase or decrease in the effective control obtained for a given amount of offset and during a given amount of banking.

The general location of the control point 15 on the far or near side of the point 21 relative to point 17 should depend upon the location and direction of the oscillation hinge 7, as will be further explained hereinafter.

Maximum control movement for point 17 is obtained when point 15 is offset from axis 16 substantially at right angles to the plane, referred to, containing banking axis 16 and non-controlled point 20.

Figure 2:
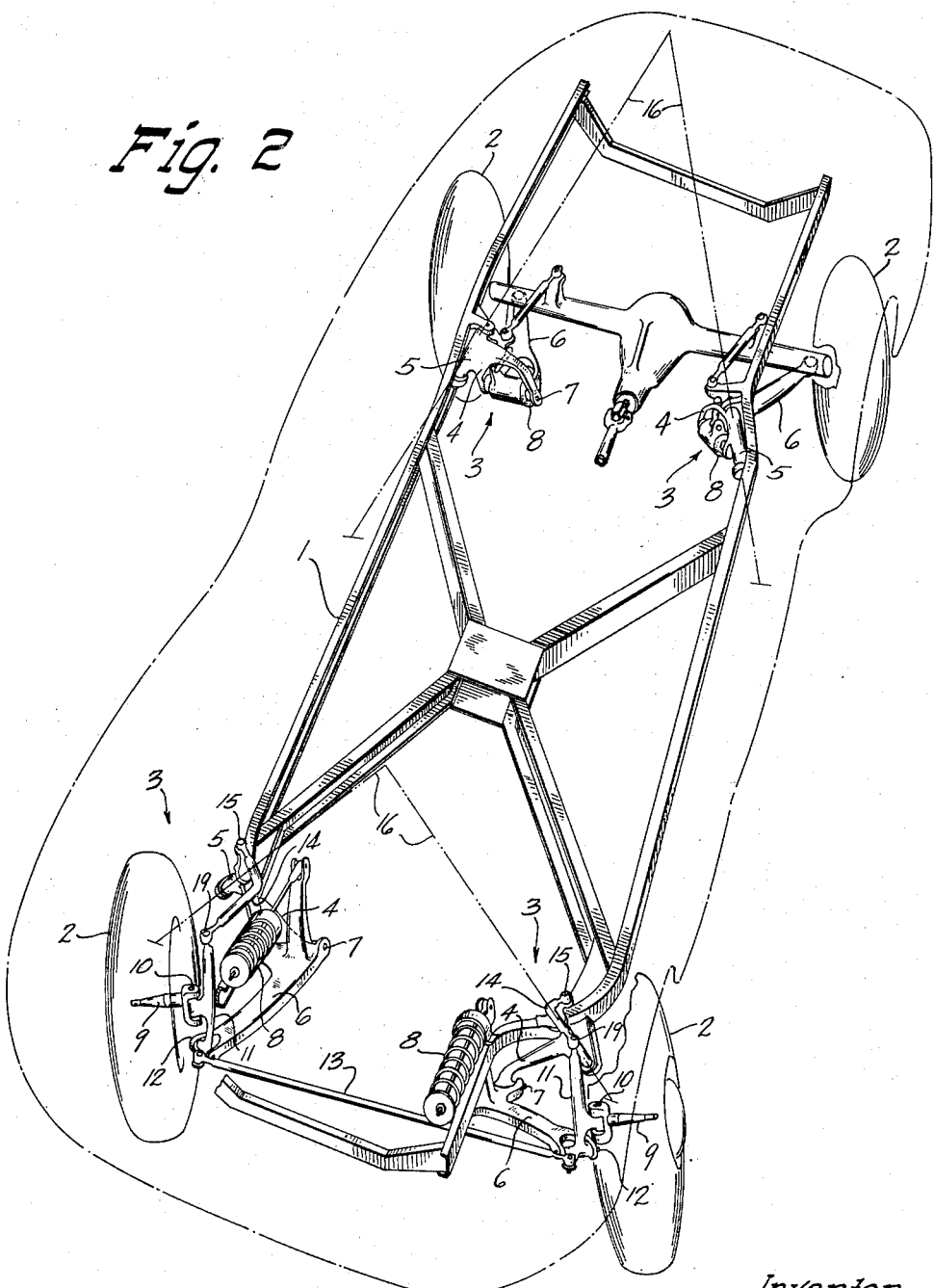
Fig. 2 is a perspective view similar to Fig. 1 showing the superstructure in an inwardly banked position as on a turn.

The geometric schematic Figures 3 to 6 illustrate the control obtained in the type of embodiment of Figs. 1 and 2.

The geometrical layout illustrated is useful in determining the location for the control point 15 for any given mounting.

Since there is relatively little camber change to be corrected in the construction of Figs. 1 and 2, and substantially all of the correction desired is in caster, a control point 15 should be chosen which will effect either a forward or rearward movement for the controlled point 17 relative to the movement it would have during banking if it were to turn about the banking axis through the same angular movement as the non-controlled point 20 does; the forward corrective movement to take place when the corresponding banking arm is on the inside of the turn, and the rearward corrective movement to take place when the corresponding banking arm is on the outside of the turn.

In making the layout it is assumed that the superstructure remains fixed at all times and that each banking arm of a pair of banking arms is rotated about its corresponding banking hinge axis 16 through the angular movement that would take place in banking of the superstructure on a turn.

The figures show the geometrical layout for the right front wheel 2 of the vehicle of Figs. 1 and 2, and Fig. 3 additionally shows the left front wheel 2 to indicate the full front elevational movement.

Fig. 3 is first developed with the wheels 2 and kingpins shown upright in the normal position for straight ahead travel of the vehicle. The road is represented by the line 22. The superstructure is represented by the point 23 which is located approximately at the center of gravity thereof. The kingpins are represented as axes 13 extending between the corresponding upper controlled points 17 and lower non-controlled points 20. The banking hinges are represented by the axes 16 inclined with respect to the road 22 and which extend upwardly and inwardly toward each other and may be said to meet at the center of motion 24 which during normal straight ahead travel is located vertically above the center of gravity 23 when the superstructure is evenly loaded, as more fully described in application Serial No. 724,062, referred to above.

After developing the normal position for the parts as described above in front elevation for Fig. 3, the same position for the parts is developed in side elevation in Fig. 5 and in top plan view in Fig. 4. Projection lines are shown extending substantially from figure to figure for this purpose.

Fig. 6 is used to obtain the banked position for the banking arm parts. It contains two views, one a projection of the kingpin upon a vertical plane containing the banking axis 16 and which shows the axis 16 in true length, and the other constituting a projection of the kingpin upon a plane disposed at right angles to the banking axis 16 and in which the axis appears to intersect the plane at a point representing the center of rotation for the banking arm during banking.

The road line 22 is shown in the first view of Fig. 6 to provide for location by projection of the kingpin axis 18 and points 17 and 20 which are known to be at given heights from the road as shown in Fig. 3.

The points 17 and 20 on kingpin axis 18 are then projected from the first view to the second view of Fig. 6 wherein the radius for circle 25 containing controlled point 17 is the turning radius for the point about the banking axis 16 assuming that no correction is made for camber or caster provided for in the present invention, and wherein the radius for circle 26 containing non-controlled point 20 is the true turning radius for the point about the banking axis 16.

The radius for circle 25 is obtained by computation from Fig. 3 and the first view of Fig. 6, the radius being equal to the hypotenuse of a right triangle having as one leg the difference in height from the road between point 17 and its true turning point 27 on axis 16, and as the other leg the distance between the two points 17 and 27 in plan view as shown in Fig. 4. The radius for circle 26 is obtained in the same manner having regard to the point 28 on axis 16 about which point 20 turns.

The approximate degree of turn of the banking arm about the effective banking axis is determined by known factors such as the forces, leverages and spring resistances involved and the desired amount of banking to be obtained. The degree of turn for the banking arm on the curve outside may be under some conditions different from the degree of turn for the opposite banking arm on the same curve.

The kingpin represented by axis 18 is shown in the second view of Fig. 6 in dotted positions for its two extremes of banking wherein it has turned about the banking axis 16 in opposite directions through the previously determined degree of angular movement.

These two dotted or banked positions for the kingpin axis 18 are then projected to the plane of the first view of Fig. 6 and from there to Figs. 4, 3 and 5 in the order named. In the first projection of point 17 in its two extremes of banked position the point is located on the respective projection lines at the position where it turns about on the same point 27 on the axis 16 at all times.

The three points 17 in the first view of Fig. 6 then lie in a common plane normal to the axis 16 at point 27. Likewise point 20 is located on the corresponding projection lines in the first view of Fig. 6 at the respective positions where it will turn about its true turning point 28 on axis 16 and always lie in a common plane normal to the axis 16 at point 28. The dotted positions for the kingpin axis 18 and points 17 and 20 in Fig. 4 are determined upon the projection lines by measurement of the distance for each point from the vertical plane of the banking hinge axis 16. This distance is determined by establishing a similar plane represented by the line 29 in the second view of Fig. 6 extending from axis points 16 at right angles to the projection of axis 16 from the first view of Fig. 6.

Then the distance of point 20 from line 29 in Fig. 6 along the projection line for point 20 will be equal to the distance appearing in plan view between point 20 and axis 16 in Fig. 4. This being so, the distance for points 17 and 20 from axis 16 in Fig. 4 after banking to either side of neutral will be the same as the corresponding distances established between the banked positions of the points in the second view of Fig. 6 and the line 29 measured along the corresponding projection lines.

After establishing the dotted banked positions for the kingpin axis 18 in Fig. 4 projection lines are drawn upwardly to Fig. 3, and the points 17 and 20 for the respective banked positions are located upon the corresponding lines by measuring the height thereof along the lines from the road 22, such heights being known and determined from those appearing in the first view of Fig. 6.

Projection lines drawn from the respective banked positions for points 17 and 20 in Fig. 3 to Fig. 5 determine the height of the same in the latter figure. The location of the points 17 and 20 in their respective banked positions in Fig. 5 is determined upon the projection lines by measuring on each corresponding line a distance from the vertical plane of the axis 30 of the wheel corresponding to the distance of the respective point from the same plane appearing in Fig. 4.

With the banked positions for kingpin axis 18 shown in broken line on each of Figs. 3, 4 and 5, it is possible to determine the amount and kind of correction desirable. It will be noted that the principal change during banking is in caster, not in camber, and that while the wheel on the inside of a turn is increased in positive caster, the wheel on the outside of the turn is moved to a negative caster position. These tend to offset each other partially and may not be too objectionable in steering.

However, the caster change can be compensated for in accordance with the present invention. For this purpose a control point 15 is arbitrarily selected in the second view of Fig. 6 on a suitable radius from axis point 16 and disposed laterally from a line 31 drawn between axis point 16 and point 20 when the latter is in neutral position and spaced from the line on the same side as the point 17 is spaced therefrom. The rules for location of the control point 15 described previously should be followed in selecting a suitable location for the point.

For the purpose of testing the suitability of the selection, the point 15 in the second view of Fig. 6 should be assumed to rotate about axis 16 through the same angular degrees as kingpin axis 18 rotates in banking. Thus three points 15 are established on a circle 32, the central point corresponding to the neutral position which should constitute the ultimate fixed location for the control point. The other two positions are the banked positions used only for check purposes on the geometric layout.

The three points 15 are then projected upwardly to the first view of Fig. 6 and are located therein on the projection lines by first locating the central point at the same height from road line 22 as the neutral point 17, and then locating the other two points to turn about the same point in the banking hinge axis 16.

The three points 15 located in the first view of Fig. 6 are then projected to Fig. 4 and located therein on the projection lines by measuring a distance for the same from the axis 16 in Fig. 4 corresponding to the distances therefor from line 29 appearing in the second view of Fig. 6.

The axis of oscillation hinge 7 is shown in Fig. 4, and it should be noted that the movement for point 15, indicated by its three positions, if the point is allowed to turn with the banking arm around axis 16, is substantially normal to the axis of hinge 7 in plan view. This is one of the requirements if it is desired to reduce the twist in wheel carrier 3 to a minimum, as for structures in which there are no ball joints to relieve the twist.

The most favorable direction for the oscillation hinge 7 in plan view will be parallel to a line drawn between control point 15 and a point on axis 16 that is located at the same height from the road as point 15.

The three points 15 appearing in Fig. 4 are then projected upwardly to Fig. 3 and the corresponding points are located in front elevation on the projection lines therefor by measuring the height of the same from road line 22 as that height appears in the first view of Fig. 6.

The points 15 are finally projected from Fig. 3 to Fig. 5 where they are again located in side elevation on the corresponding projection lines therefor by measuring the distance for the respective point from the vertical plane of wheel axis 30 as it appears in Fig. 4.

The selected central control point 15, as it appears in Fig. 5, is then tested for suitability by drawing the effective control arm 14 between the point 15 and controlled point 17 when the latter is in neutral non-banked position, and then drawing an arm 14 of the same length for each of the banked positions to locate the controlled points 17 as they would appear in the corrected position after banking, when the construction of the present invention is used.

The selected control point 15 illustrated substantially reduces the change in caster by reducing the forward and rearward movements of the controlled point 17 during banking, as indicated in Fig. 5. The corrected positions for the kingpin axis 18 in side elevation after banking are shown in light full lines in Fig. 5. The same corrected positions are projected through Fig. 3 to Fig. 4 and shown in top plan view therein.

The movement for the controlled point 17 during banking is shown to be more nearly parallel to the movement of the non-controlled point 20 in plan elevation in Fig. 4. This is one of the advantages in control of the caster by the invention.

Fig. 3 additionally illustrates the wheels 2 in one of the banked positions wherein the wheels are slanting relative to the fixed superstructure and a new road line 22 is established also slanting relative to the superstructure. The slant thus established actually represents the amount of banking or tilting of the superstructure inwardly on a turn, but since in the geometric layout the superstructure is assumed to be fixed the wheels and road are moved relatively thereto to illustrate the banking obtained.

In selecting the point 15 arbitrarily in Fig. 6 it is possible that a point will be selected that will not give the desired control or correction for a given design of mounting. If this proves to be the case, the designer then profits by the amount of error shown thereby in Fig. 5 and selects a new point for test. If the rules described herein are followed with care practically the only variable necessary for test purposes is the distance for the point 15 from the axis 16, i. e. the radius for circle 32. A major factor generally involved, however, is the space requirements for the mounting, and this factor cannot be illustrated here, but should be given consideration in the final geometrical layout prior to constructing a mounting.

Fig. 7 illustrates in perspective how the several views of Figs. 3 to 6 are taken from a single mounting. In this figure the several views are shown in perspective on their respective planes and arrows indicate the direction of the views.

Fig. 8 is a similar perspective layout for the views of Figs. 10 to 13 which constitute the geometrical layout for the embodiment of Fig. 9.

The embodiment of Figs. 8 to 13 is designed to provide a wheel carrier 3 which is set at an angle somewhere between the longitudinal direction of the carrier 3 of Figs. 1 to 7, and a transverse direction. In this type of construction a turn at the banking hinge axis 16 would, except for the invention, effect a substantial change in both caster and camber. The springs 8 are disposed vertically upon the lower suspension arm 6 and the upper support for the spring is hinged to the superstructure and connected by a bell crank 33 and link 34 to the banking hinge support member 4 to be operated upon a turn at the banking hinge 5.

In this embodiment the wheel carriers 3 for the front wheels 2 are disposed in front of the axis of the wheel spindles 9 and the banking hinge axes 16 incline upwardly and rearwardly, inwardly toward each other, as distinguished from the axes 16 in Figs. 1 to 7, which incline upwardly and forwardly, inwardly toward each other.

The control points 15 are offset from the corresponding axes 16 in substantially the manner described above for the control points 15 of Figs. 1 to 7.

The control arms 14 are secured to the superstructure 1 by ball and socket joints at the corresponding control points 15, and to the corresponding kingpin supports 11 by the horizontal hinge pivots 19 disposed substantially parallel to hinges 12 for the suspension arm.

Each member of the wheel carrier 3 is substantially free from twist if the following requirements are present: (1) the control point 15 is disposed at the same height from the road as the pivot 19 and controlled point 17 when the superstructure is upright; (2) the distance between the control point 15 and the controlled point 17 is the same as the distance between controlled point 17 and a point on the banking hinge axis 16 which is at the same height from the road as control point 15; and (3) the control point 15 is positioned relative to oscillation hinges 7 and 12 so that if the control point were allowed to move as a part of the banking arm about the banking hinge axis 16 during banking, such movement of the control point would appear in plan view to be substantially at right angles to the axes of the oscillation hinges.

The geometric schematic layout illustrating the control obtainable by the construction of Fig. 9 is shown in Figs. 10 to 13, which are similar to Figs. 3 to 6.

The manner in which the layout is constructed is the same as that previously described for the layout of Figs. 3 to 6, and need not be repeated here.

In this layout the development of the kingpin control by the selected point 15 must take into account a substantial correction in both camber and caster. For this purpose the three points 15, i. e. the central neutral point and the two banked positions therefor established by assuming that the point is allowed to move with the banking arm about axis 16, are projected throughout all of the figures. The amount of correction in the movement of the controlled point 17 in each figure corresponds to the assumed movement of the control point 15 in each instance as it appears in the corresponding projections.

The locations for the three points 15 on the projection lines leading from the first view of Fig. 13 to Fig. 11 is determined by the distance of the respective points from the vertical plane of axis 16 as indicated in the second view of Fig. 13. The location of the three points 15 on the projection lines leading from Fig. 11 to Fig. 10 is determined by the distance of the respective points from the road line 22 as shown in the first view of Fig. 13. The location of the three points 15 on the projection lines leading from Fig. 10 to Fig. 12 is determined by the distance of the respective points from the vertical plane of the wheel axis 30 as indicated in Fig. 11.

In Fig. 11 the effective oscillation axes 15 and 19 for the oscillation connections of the control arm 14 to the superstructure 1 and to the kingpin support 11, respectively, are illustrated. The movement for point 15, if it were allowed to move with the banking arm in turning about axis 16, is indicated as being substantially normal to the oscillation axis for the connection 15 at all times. In Fig. 11 this is shown by the lines representing the oscillation axis for connection 15 for each of its three positions, and the further showing that the direction of the adjustment of point 17 obtained in each instance is substantially perpendicular to such axis in plan view.

Fig. 10 shows the corrected camber for the wheels in one banked position, the broken line wheel position being the banked position for the wheels without the correction of the present invention and the light line position corresponding to the corrected position obtained by employing the present invention. The correction in camber is purposely insufficient to provide a complete compensation for camber change, since it may be desirable to have the wheels tilt toward the outside on a turn in order to follow the fender space as the superstructure moves outwardly on the turn. This is particularly important with respect to the wheel on the inside of the turn since the superstructure moves downwardly relative thereto as it moves laterally.

In this connection it is possible to maintain the wheel on the outside of the curve substantially upright and to allow the wheel on the inside of the curve to tilt outwardly to accommodate space requirements, a construction which is acceptable in many instances due to the fact that the inside wheel carries less load on the curve than the outside wheel.

The construction of Figs. 14 to 16 illustrates a design in which the banking hinges 5 are disposed horizontally and parallel to the longitudinal center line of the vehicle. Fig. 14 shows the construction schematically in front elevation with the wheels and superstructure in normal upright position. Fig. 15 shows the construction in top plan view, and Fig. 16 is similar to Fig. 14 showing the construction with the parts in a banking position as on a turn.

The mounting and operation of spring 8 is substantially the same as for the construction of Fig. 9.

In this construction the control obtained is solely in camber since the caster remains substantially constant at all times. The camber control in which the wheels are maintained more nearly upright is shown in the shaded areas in Fig. 16.

The construction of Figs. 14 to 16 is completely free from twist and therefore the rules described to free the carrier members from twist, as in the case of the construction of Figs. 8 to 13, are not required here. This means that the more nearly horizontal the banking hinges are, the greater is the freedom of design in the location for the control arm 14.

By locating the control arm 14 high up, as shown, a better oscillation geometry is obtained, since a longer control arm and suspension arm may be employed.

In general, the longer the effective banking arm, the less is the change in camber and caster to be controlled. Short banking arms have to transcribe a larger angular movement for a given banking effect, than long arms.

By controlling and additionally moving the controlled point 17 of the kingpin there is a change in length for the banking arm during banking.

In the construction of Figs 1 and 2 this change of length is relatively unimportant in the banking operation and is reflected almost solely in the desired control of the caster.

In the construction of Fig. 9 and more in the construction of Figs. 14 to 16, the change in length of the banking arm becomes a factor in the banking operation.

As the banking hinge axis 16 approaches a horizontal position in the design of the mounting, the location of the control point 15 may be made to effect a substantial improvement in banking of the superstructure at the same time as it improves the camber.

In general, the turn of the kingpin around its banking hinge leads it into certain more or less acceptable positions. The inclination of the banking hinge axis determines these positions.

By adding a new means to influence the positions of the caster and camber angle of the kingpin more freedom will be given to choose the inclination of the banking hinge axis. itself. Not considering this invention, it is, for instance, necessary to keep the banking hinge fairly far away from the kingpin in order to avoid too large a caster or camber change. By employing means to control the changes, the banking hinge may be placed nearer towards the kingpin, which for many reasons might be desirable.

The invention is susceptible of many different specific embodiments. For instance, it is possible to locate the suspension arm 6 above the control arm 14, as shown for the front wheel mountings in Fig. 17.

In this illustration the pivot 19 lies on the kingpin axis 18 and is disposed directly between the control arm 14 and the spindle bearing support 9, which latter forms part of the kingpin 10 and the upper end of which is supported by kingpin support member 11.

The coil spring 8 is mounted horizontally between a bell crank on the upper suspension arm 6 and a bracket on the superstructure 1, similar to the construction of Fig. 1.

Fig. 17 also illustrates the application of the invention to the rear drive wheels 2, which are non-steerable, and which are mounted independently as set forth in copending application Serial No. 771,717, filed by the present inventor.

The rear mounting illustrated has the differential housing 35 suspended from the superstructure 1 by the horizontal pivot hinge 36 extending longitudinally of the superstructure. The wheels 2 are connected to the superstructure 1 by wheel carriers of the general type of Fig. 1 each with the lower suspension arm 6 pivoted to a support member 11 by a horizontal hinge 12. The bearing support member 9 constitutes the kingpin and is supported at its lower end by kingpin support member 11 and at its upper end by the control arm 14, providing a vertical pivot 10 similar to the kingpin of Fig. 1.

The rear wheels 2 are blocked against steering by tie rods 37 extending from the rear side of member 9 to the differential housing 35.

The drive for the rear wheels is by means of separate drive shafts 38 connected to the differential by universal joints 39 and to the hub of each wheel by universal joints 40.

The spring 8 is in the form of a leaf spring and is secured at its center to the swinging differential housing 35, and shackled at its ends to the bearing support member 9.

The control points 15 are offset from the corresponding banking hinge axes 16 to maintain the caster for kingpin pivot 10 and thereby take lateral and brake forces without any danger of possible substeering.

In both front and rear mountings it is possible to design the same to avoid twist.

Where the carrier is designed to be free from twist it is not necessary to employ ball and socket joints for the connections between the control arm 14 and the superstructure 1.

This construction makes possible the carrying of additional loads such as lateral and brake forces by the control arms 14, and a corresponding lightening of the construction of the suspension arms 6.

Figure 18:
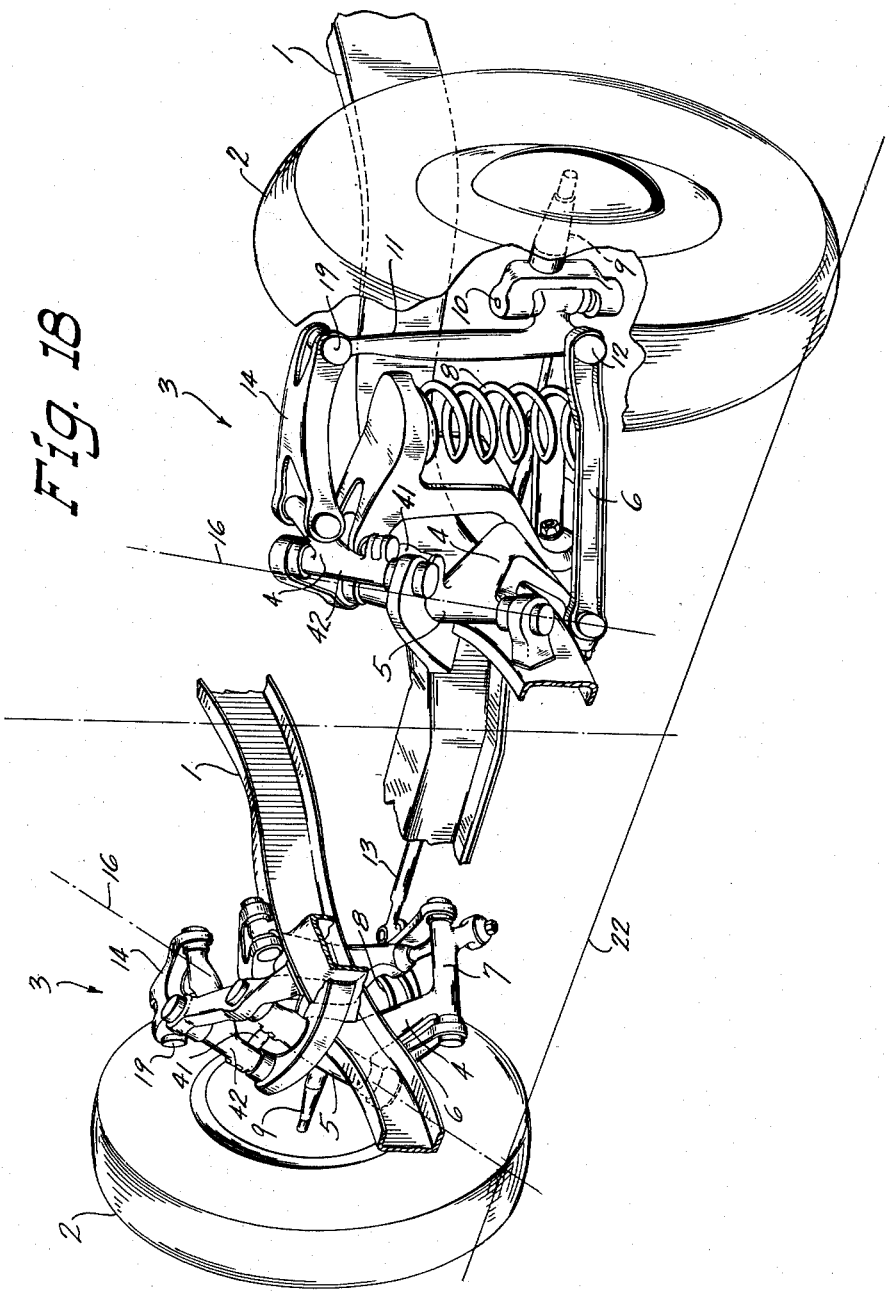
Fig. 18 is a perspective view of a modified construction for the invention in which two separate banking hinges are employed.

Fig. 18 illustrates such a construction in which no ball and socket joint is present. This latter construction employs a skew universal joint between control arm 14 and superstructure 1, corresponding to the skew universal joint between suspension arm 6 and superstructure 1, and connects the corresponding support members 4 by a shackle 41 to compel operation of the two members 4 in unison during banking. The pivot hinges between control arm 14 and its corresponding support member 4 and also support member 11 are parallel to each other and parallel to the corresponding oscillation hinges 7 and 12, to provide freedom for vertical oscillation of the wheel 2. Likewise the pivot hinges between shackle 41 and the respective support members 4 are parallel to each other and parallel to the banking hinge 5 and the hinge 42 between the control arm support member 4 and the superstructure 1, to provide for freedom of movement of the arms in unison during banking.

The arms 6 and 14 constitute suspension arms to the extent of their respective participation in carrying loads. Likewise they both constitute control arms to the extent that each contributes to the adjustment of the position of the kingpin axis 18.

The construction of Fig. 18 wherein the arms are interconnected by shackle 41 compels arms 6 and 14 to act in unison, thereby constituting each a suspension arm and also a control arm.

In this construction neither hinge 5 nor hinge 42 will constitute the true banking axis for the banking arm, but a resultant effective banking axis will be established. This effective banking axis does not remain fixed relative to the superstructure 1 during banking, but may have a limited movement in a direction increasing the banking action obtainable for a given angular movement of the banking arm.

In all of the embodiments of the invention an articulated banking connection is employed between the suspension arm and the superstructure. In the embodiments of Figs. 1 to 13, and 17 and 18 a skew or banking type of universal joint is employed between at least one of the arms of the carrier and the superstructure to guide the latter to a banked position on turns. In the embodiment of Figs. 14, 15 and 16, where the banking axis is substantially horizontal and disposed longitudinally of the superstructure, a universal joint becomes unnecessary and the banking is obtained by bringing the two pivot axes of the articulated joint structure into parallel relationship. By this means one of the arms of the carrier may be pivoted directly to the superstructure, thereby eliminating one of the pivot hinges otherwise required for banking.

The control arm in each instance should be considered as a secondary suspension arm, particularly where it serves to take load forces of any kind. The functioning of the control arm or secondary suspension arm may vary from that of mere control to that of carrying substantially equal loads with the main suspension arm, depending upon the design of the banking arm.

The invention may have various embodiments within the scope of the claims.

I claim:

1. In a vehicle in which the superstructure is supported for inward banking on turns by a plurality of pairs of correlated banking arms having corresponding banking axes inclined from the horizontal, at least one pair of banking arms constituting independent wheel mountings and including therein the wheels for supporting the same on the road with wheel support members disposed to carry the corresponding wheels upon substantially vertically disposed pivotal axes and adapted to oscillate vertically relative to the superstructure substantially independently of the corresponding banking axis, a control arm constituting a part of each said latter specified banking arm connected between the wheel support member and the superstructure with the latter connection offset from the inclined banking axis to provide a control of the change in either caster or camber or both during inward banking of the superstructure and provide a parallelogram wheel mounting to maintain the caster and camber within acceptable limits during vertical oscillation of the wheel.

2. In a vehicle of the class described, a superstructure, a pair of banking arms secured to the superstructure to turn relative thereto on corresponding correlated banking axes inclined from the horizontal and which effect inward banking of the superstructure on curves, a road wheel constituting the outer end of each banking arm and carried by a substantially vertical pivot to provide for steering control of the wheel angularly relative to its carrier, the remainder of each banking arm between said pivot and the superstructure constituting the wheel carrier having a substantially horizontal suspension arm connected to a support member for said pivot and providing for vertical oscillation of the pivot support and wheel substantially independently of a turn at the corresponding banking axis, and means constituting a part of each carrier to control the angular movement of said pivot and of said wheel in caster and camber during banking movement of the banking arm comprising a control arm movably connected between the pivot support and the superstructure with the connection to the pivot support spaced axially of the pivot from the suspension arm connection thereto in a direction to dispose the control arm substantially horizontal for cooperation with said suspension arm in providing parallelogram action in vertical oscillation of the wheel and with the connection to the superstructure offset from the inclined banking axis.

3. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections being articulated to provide for turn of the corresponding suspension arm about a banking axis during banking of the superstructure, and the other connection being offset from the said axis to provide an effective banking axis for the entire banking arm and a control of camber and caster changes during turn of the banking arm at said last named axis.

4. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a skew universal connection between each suspension arm and the superstructure providing for vertical oscillation of the wheel relative to the superstructure and for turning of the entire banking arm about an effective inclined banking axis during banking of the superstructure, the banking hinges being offset from each other to control changes in caster and camber for the wheel.

5. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and lower arm disposed substantially horizontally in normal position and spaced vertically from one another, a wheel support member horizontally pivoted to the outer ends of said suspension arms and embodying a substantially vertical pivot for steering control of the wheel, and a skew universal connection between each suspension arm and the superstructure providing for vertical oscillation of the wheel relative to the superstructure and for turning of the entire banking arm about an effective inclined banking axis during banking of the superstructure, the banking hinges being interconnected to turn in unison and being offset from each other to control changes in caster and camber for the wheel.

6. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections constituting a skew universal joint to provide an inclined banking hinge for turn of its corresponding suspension arm during banking, and the other connection being universally movable and offset from the axis of said banking hinge to provide a control for changes in caster and camber of the vertical pivot during banking, both connections providing an effective banking axis for the banking arm.

7. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections having both a horizontal hinge for said vertical oscillation and a banking hinge for compelling the entire banking arm to turn in response to lateral movement of the superstructure on road turns, and the other connection being offset laterally from said banking hinge to provide a control of changes in caster and camber for the wheel during banking and cooperating with said banking hinge to establish an effective banking axis for the banking arm.

8. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections having both a horizontal hinge for vertical oscillation and a banking hinge for compelling the entire banking arm to turn in response to lateral movement of the superstructure on road turns, and the other connection having a single horizontal hinge offset substantially vertically from said banking hinge to provide a control of changes in camber for the wheel during banking, and cooperating with said banking hinge to establish an effective banking axis for the banking arm.

9. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections having both a horizontal hinge for vertical oscillation and a skew banking hinge for compelling the entire banking arm to turn about an inclined banking axis in response to lateral movement of the superstructure on road turns, and the other connection having a single universally movable joint offset from the axis of said banking hinge in a direction corresponding to the direction of said vertical pivot looking toward the corresponding suspension arm from the suspension arm carried by said banking hinge whereby changes in caster and camber for the wheel during banking are substantially reduced.

10. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections being articulated to provide for turn of the corresponding suspension arm about a banking axis during banking of the superstructure, and the other connection being offset from the said axis in a direction corresponding to the direction of said vertical pivot looking toward the corresponding suspension arm from the suspension arm carried by said articulated connection, whereby changes in caster and camber for the wheel during banking are substantially reduced and an effective banking axis is provided for the entire banking arm.

11. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections having both a horizontal hinge for said vertical oscillation and a banking hinge for compelling the entire banking arm to turn in response to lateral movement of the superstructure on road turns, and the other connection being offset laterally from said banking hinge in a direction corresponding to the direction of said vertical pivot looking toward the corresponding suspension arm from the suspension arm carried by said banking hinge, whereby changes in caster and camber for the wheel during banking are substantially reduced and an effective banking axis is provided for the entire banking arm.

12. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections constituting a skew universal joint to provide an inclined banking hinge for turn of the entire banking arm during banking, and the other connection being universally movable and offset from the axis of said banking hinge in a direction corresponding to the direction of said vertical pivot looking toward the corresponding suspension arm from the suspension arm carried by said banking hinge, whereby changes in caster and camber for the wheel during banking are substantially reduced and an effective banking axis is provided for the entire banking arm.

13. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally pivoted to the outer ends of said suspension arms and embodying a substantially vertical pivot for steering control of the wheel, and a skew universal connection between each suspension arm and the superstructure providing for vertical oscillation of the wheel relative to the superstructure and for turning of the entire banking arm about an effective inclined banking axis during banking of the superstructure, each of said connections constituting an articulated joint connected with the other to operate in unison therewith and comprising a substantially horizontal oscillation hinge and a banking hinge which latter hinge is inclined upwardly toward the vertical plane of the wheel axis transverse to the superstructure and toward the vertical longitudinal median plane of the superstructure, with the banking hinges for the suspension arms substantially parallel and offset from each other to provide an effective banking axis for the banking arm different from the axis of either banking hinge and which is movable to reduce changes in caster and camber for the wheel during banking.

14. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, a wheel support member horizontally hinged to the outer ends of said suspension arms and embodying a substantially vertical pivot for steering control of the wheel, a skew universal connection between each suspension arm and the superstructure providing for vertical oscillation of the wheel relative to the superstructure and for turning of the entire banking arm about an effective inclined banking axis during banking of the superstructure, each of said connections having a hinge support member between a substantially horizontal oscillation hinge and a banking hinge which latter hinge is inclined upwardly toward the vertical plane of the wheel axis transverse to the superstructure and toward the vertical longitudinal median plane of the superstructure, with the banking hinges for the suspension arms substantially parallel and offset from each other to provide an effective banking axis for the banking arm different from the axis of either banking hinge and which is movable to reduce changes in caster and camber for the wheel during banking, and a shackle interconnecting said hinge support members on pivotal axes parallel to said banking hinges to distribute load forces to both suspension arms.

15. A vehicle in which the superstructure is supported for inward banking movement on turns by a plurality of pairs of correlated banking arms connected to the superstructure to turn about corresponding banking axes, at least one pair of said banking arms including therein the wheels for supporting the same on the road and providing for resilient independent vertical oscillation of the wheels with a tie between the arms providing for correlated action of the arms during banking, and each of said latter banking arms comprising a parallelogram suspension structure having an upper and a lower arm disposed substantially horizontally in normal position and spaced vertically from one another, each suspension arm extending in a direction substantially parallel to the longitudinal center line of the superstructure, a wheel support member horizontally pivoted to the outer ends of said suspension arms and embodying a substantially vertical pivot for steering control of the wheel, and a pivotal connection between each suspension arm and the superstructure providing for vertical oscillation of the wheel relative to the superstructure, one of said connections constituting a skew universal joint to provide an inclined banking hinge for turn of its corresponding suspension arm during banking, and the other connection being universally movable and offset from the axis of said banking hinge in a direction corresponding to the direction of said vertical pivot looking toward the corresponding suspension arm from the suspension arm carried by said banking hinge, whereby changes in caster for the wheel during banking are substantially reduced and an effective banking axis is provided for the entire banking arm.

16. In a vehicle in which the superstructure is supported for inward banking on turns by a plurality of pairs of correlated banking arms having corresponding banking axes inclined from the horizontal, at least one pair of banking arms constituting independent wheel mountings and including therein the wheels for supporting the same on the road with wheel support members disposed to carry the corresponding wheels upon substantially vertically disposed pivotal axes and adapted to oscillate vertically relative to the superstructure substantially independently of the corresponding banking axis, a control arm constituting a part of each said latter specified banking arm connected between the wheel support member and the superstructure with the latter connection offset from the inclined banking axis to provide a control of the change in caster and camber during inward banking of the superstructure and provide a parallelogram wheel mounting to maintain the caster and camber within acceptable limits during vertical oscillation of the wheel, both connections for the control arm being at substantially the same height from the road level.

17. In a vehicle of the class described, a superstructure, a pair of banking arms secured to the superstructure to turn relative thereto on corresponding correlated banking axes inclined from the horizontal, a road wheel constituting the outer end of each banking arm and carried by a substantially vertical pivot to provide for steering control of the wheel angularly relative to its carrier, the remainder of each banking arm between said pivot and the superstructure constituting the wheel carrier having a substantially horizontal suspension arm connected to a support member for said pivot and providing for vertical oscillation of the pivot support and wheel independently of a turn at the corresponding banking axis, and means constituting a part of each carrier disposed to control the angular movement of said pivot and of said wheel in caster and camber during banking movement of the banking arm comprising a control arm movably connected between the pivot support and the superstructure with the connection to the pivot support disposed at substantially the same height as the connection between the control arm and the superstructure to provide a parallelogram control of caster and camber during vertical oscillation.

18. In a vehicle of the class described, a superstructure, an air of banking arms secured to the superstructure to turn relative thereto on corresponding correlated banking axes, a road wheel constituting the outer end of each banking arm and carried by a substantially vertical pivot to provide for steering control of the wheel angularly relative to its carrier, the remainder of each banking arm between said pivot and the superstructure constituting the wheel carrier having a substantially horizontal suspension arm connected to a support member for said pivot and providing for vertical oscillation of the pivot support and wheel, and means constituting a part of each carrier to control the angular movement of said pivot and of said wheel in caster and camber during banking movement of the banking arm comprising a control arm pivoted at one end to said pivot support to provide a controlled point on the axis of said vertical pivot for the adjustment of said angular movements, and pivoted at the other end to the superstructure at a control point offset from the banking axis and disposed at the same height as said controlled point, the distance from the controlled point to the control point in plan view being substantially the same as the distance from the controlled point to a point of the same height on the banking axis.

19. In a vehicle of the class described, a superstructure, a pair of banking arms secured to the superstructure to turn relative thereto on corresponding correlated banking axes, a road wheel constituting the outer end of each banking arm and carried by a substantially vertical pivot to provide for steering control of the wheel angularly relative to its carrier, the remainder of each banking arm between said pivot and the superstructure constituting the wheel carrier having a substantially horizontal suspension arm connected to a support member for said vertical pivot by a horizontal oscillation hinge and to the superstructure by an articulated joint embodying a horizontal oscillation hinge and a banking hinge providing for vertical oscillation of the pivot support and wheel, and means constituting a part of each carrier to control the angular movement of said pivot and of said wheel in caster and camber during banking movement of the banking arm comprising a control arm pivoted at one end to said pivot support to provide a controlled point on the axis of said vertical pivot for the adjustment of said angular movements, and pivoted at the other end to the superstructure at a control point offset from the banking axis and disposed at the same height as said controlled point, the distance from the controlled point to the control point in plan view being substantially the same as the distance from the controlled point to a point of the same height on the banking axis, a line connecting said control point and said point of the same height on the banking axis being substantially parallel to said oscillation hinges.

20. A vehicle comprising a superstructure and paired front and rear wheels, paired wheel carriers for said wheels each comprising a wheel supporting member, a suspension arm hingedly connected to the wheel supporting member, a bracket hingedly connected to the suspension arm and connected to the superstructure on a hinge axis inclined both laterally and longitudinally of the vehicle, and a second suspension arm on each of the wheel carriers hingedly connected to the wheel supporting member and pivotally connected to the superstructure at a point lying outside of said axis, whereby the superstructure is banked in response to and in a direction opposite to lateral forces acting thereon while the caster of the front wheels is maintained constant.

21. A superstructure banking vehicle comprising a superstructure and paired front and rear wheels, paired wheel carriers for the front wheels each comprising a kingpin support, a suspension arm hingedly connected both to said support and to a pintle member, said member being connected to the superstructure on a banking hinge axis inclined both laterally, vertically and longitudinally of the vehicle to effect inward banking of the superstructure on turns, and a second suspension arm in articulated relation to said support and to a point on said superstructure outside of said axis, each of said front wheel carriers being so constructed and arranged as to prevent substantial changes in caster and camber of the kingpin of its corresponding wheel as the wheel carrier swings about its banking hinge axis.

22. A superstructure counter banking vehicle comprising a superstructure and paired front and rear wheels, paired wheel carriers for the front wheels each comprising a kingpin support, a suspension arm hingedly connected to said support and to a pintle member, said member being connected to the superstructure on an inclined banking hinge axis to effect inward banking of the superstructure on turns, and a second suspension arm pivotally connected to said support and to a point on the superstructure displaced substantially laterally from said axis and cooperating with the first mentioned suspension arm to prevent substantial changes in the caster and camber of the kingpin as the wheel carrier swings about its banking hinge axis.

23. A superstructure counter banking vehicle comprising a superstructure and paired front and rear wheels, paired wheel carriers for the front wheels each comprising a kingpin support, a lower suspension arm connected to said support and connected by a universal joint to the superstructure with one axis of said universal joint extending along a hinge axis inclined upwardly toward the median plane of the vehicle and toward the wheel with which it is associated to effect inward banking of the superstructure on turns, and an upper suspension arm pivotally connected to said support and to a point on the superstructure displaced laterally outwardly from said axis and cooperating with the first mentioned suspension arm to control the caster and camber of the kingpin as the wheel carrier swings about its banking hinge axis.

24. A vehicle of the type wherein the superstructure moves to banked position in response to and in a direction opposite to lateral forces, comprising independently suspended front wheel carriers each comprising a kingpin support, a suspension arm hingedly connected to said support, a member connected to said suspension arm on a substantially horizontal axis and connected to the superstructure along an upwardly inclined hinge axis, a second suspension member connected by ball and socket joints to said support and to said superstructure at a point displaced from said axis, and resilient means tending to maintain the suspension arms in normal position.

25. A vehicle comprising a superstructure and paired front wheels, a wheel carrier for each of said wheels comprising a kingpin support, a bracket hinged to said superstructure along an axis inclined toward the axis of the associated wheel and toward the median plane of the vehicle, a suspension arm hingedly connected to the upper portion of said support and to said bracket, a second suspension arm hingedly connected to the lower portion of said support and connected to the superstructure by a universal joint spaced from said axis, a spring actuating member on one of said suspension arms displaced from said axis, and resilient means stressed by said actuating member upon vertical or lateral movement of the associated wheel, whereby the superstructure is resiliently banked in response to and in a direction opposite to lateral forces acting thereon while the caster and camber of the wheels is maintained constant.

26. A vehicle comprising a superstructure and paired front and rear wheels, a wheel carrier for each of said wheels comprising a wheel support, a suspension arm connected to said support and having an articulated connection to the superstructure along an upwardly inclined banking axis, a guide rod connected to the wheel supporting member and to the superstructure and disposed to cooperate with said suspension arm to control the effective wheel base of the vehicle on turns, and resilient means associated with the suspension arm to be influenced by vertical or lateral movement of the wheel relative to the superstructure, whereby the superstructure is yieldingly banked in response to and in a direction opposite to lateral forces acting thereon while the caster of the wheels is maintained substantially constant.

27. A superstructure counter banking vehicle comprising a superstructure, independently suspended rear wheels, a wheel carrier for each of said wheels comprising a wheel supporting member, a bracket hinged to the superstructure along an inclined axis, a suspension arm hingedly related to said bracket and said wheel supporting member, a pivotal connection between the wheel supporting member and the suspension arm, and a connection between the wheel supporting member and the superstructure at a point spaced from said hinge axis to maintain the caster of said wheel during shifting of the superstructure into banked position.

28. In a vehicle comprising a superstructure and front and rear wheels, front and rear wheel carriers each comprising a pair of brackets spaced on opposite sides of the median plane of the superstructure and hinged to the superstructure with the upper end of the hinge axis of each bracket inclined toward the median plane and toward the axis of the corresponding wheel with which it is connected, and a wheel suspension for each corresponding wheel and bracket comprising an arm hinged to said bracket on an axis non-parallel to the axis of said first mentioned hinge and supported at its outer end by said wheel, a spring seat on said arm laterally spaced from the axes of both hinges, a stationary spring seat on said superstructure, a spring disposed between said spring seats to oppose pivotal movement of said arm and bracket in one direction, and a second wheel suspension arm connected by a universal joint to the superstructure at a point spaced from the axis of said first mentioned hinge and supported at its outer end by said wheel, whereby the superstructure is supported on the wheels and is banked inwardly in response to lateral forces thereon as in the case of centrifugal forces in manipulating curves while the caster and camber of the wheels are maintained substantially constant.

29. A vehicle comprising a superstructure and front and rear wheels, front and rear wheel carriers each comprising a pair of brackets spaced on opposite sides of the median plane of the superstructure and hinged to the superstructure with the upper end of the hinge axis of each bracket inclined toward the median plane and toward the axis of the corresponding wheel with which it is connected, and a wheel suspension for each corresponding wheel and bracket comprising an arm hinged to said bracket on an axis non-parallel to the axis of said first mentioned hinge and supported at its outer end by said wheel, a spring seat on said arm spaced from the axes of both hinges, a spring seat carried by said superstructure, a spring connected to said spring seats to oppose pivotal movement of said arm and bracket in one direction, and a second wheel suspension arm universally connected to the superstructure at a point spaced from the axis of said first mentioned hinge and supported at its outer end by said wheel, whereby the superstructure is banked inwardly in response to and in a direction opposite to lateral forces thereon while the caster and camber of the wheels is maintained constant.

30. In a vehicle in which the superstructure is supported for inward banking on turns by a plurality of pairs of correlated banking arms having corresponding banking axes, at least one pair of banking arms constituting independent wheel mountings and comprising therein the wheels for supporting the same on the road, a kingpin axis for each wheel to provide for steering control, a non-controlled point on said kingpin axis disposed to turn about the banking axis relative to the superstructure during banking of the superstructure, a controlled point on said kingpin axis disposed to turn about a control point on the superstructure offset from the banking axis, and a wheel carrier disposed between said kingpin axis and the superstructure providing a parallelogram support for said kingpin axis during vertical oscillation of the wheel relative to the superstructure and providing for the respective turning movements of said non-controlled point and said controlled point during banking of the superstructure, the control point being offset from the banking axis and spaced from a plane containing the non-controlled point and the banking axis on the same side as the controlled point is spaced from said plane.

JOACHIM KOLBE.

REFERENCES CITED

The following references are of record in the file of this patent:

UNITED STATES PATENTS

| Number | Name | Date |
|---|---|---|
| 2,092,612 | Olley | Sept. 7, 1937 |
| 2,153,083 | Griswold | Apr. 4, 1939 |